(12) United States Patent
Bevc et al.

(10) Patent No.: US 11,524,326 B2
(45) Date of Patent: Dec. 13, 2022

(54) METHOD FOR OPERATING A FORMING PRESS

(71) Applicant: Bayerische Motoren Werke Aktiengesellschaft, Munich (DE)

(72) Inventors: Boris Bevc, Munich (DE); Philipp Craighero, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 9 days.

(21) Appl. No.: 16/803,151

(22) Filed: Feb. 27, 2020

(65) Prior Publication Data

US 2020/0188982 A1 Jun. 18, 2020

Related U.S. Application Data

(63) Continuation of application No. PCT/EP2018/071360, filed on Aug. 7, 2018.

(30) Foreign Application Priority Data

Sep. 4, 2017 (DE) .................... 10 2017 215 395.4

(51) Int. Cl.
*B21D 24/14* (2006.01)
*G05B 19/4069* (2006.01)
(Continued)

(52) U.S. Cl.
CPC ............. *B21D 24/14* (2013.01); *B21D 22/22* (2013.01); *B30B 15/26* (2013.01);
(Continued)

(58) Field of Classification Search
CPC .......... B30B 15/26; B21D 22/22; B21D 24/14
See application file for complete search history.

(56) References Cited

U.S. PATENT DOCUMENTS 4,635,466 A * 1/1987 Seki .................. B21D 24/02
                                                    100/259
5,450,347 A * 9/1995 Thoms ................ B30B 15/26
                                                    700/146
(Continued)

FOREIGN PATENT DOCUMENTS

CN 101370603 A 2/2009
CN 104822471 A 8/2015
(Continued)

OTHER PUBLICATIONS

KR 20090003867 Machine Translation, 2009 (Year: 2009).*
(Continued)

*Primary Examiner* — Jessica Cahill
*Assistant Examiner* — Jared O Brown
(74) *Attorney, Agent, or Firm* — Crowell & Moring LLP

(57) ABSTRACT

A method for operating a forming press which includes a plurality of press components and a plurality of tool components. The forming press has at least one force sensor and at least one force actuator, each arranged in a press and/or tool component. A forming simulation is carried out, which takes into consideration an elastic behavior of the press and/or tool components. Target values of forces acting on at least one press and/or tool component are determined by the forming simulation. A forming process is carried out by the forming press. During the forming process, actual values of forces acting on the press and/or tool components are measured by the force sensor and the force actuator is actuated via a control loop such that the actual values correspond to the target values from the forming simulation.

10 Claims, 5 Drawing Sheets

(51) Int. Cl.
  *B21D 22/22* (2006.01)
  *B30B 15/26* (2006.01)
  *B30B 15/00* (2006.01)

(52) U.S. Cl.
  CPC ...... *G05B 19/4069* (2013.01); *B30B 15/0094* (2013.01); *G05B 2219/37357* (2013.01); *G05B 2219/45152* (2013.01)

(56) References Cited

U.S. PATENT DOCUMENTS

| | | | | |
|---|---|---|---|---|
| 5,450,756 | A * | 9/1995 | Kirii | B21D 24/08 73/825 |
| 5,457,980 | A * | 10/1995 | Kirii | B21D 24/08 72/351 |
| 5,540,073 | A * | 7/1996 | Kirii | G05B 19/40937 72/15.1 |
| 5,687,598 | A * | 11/1997 | Kirii | B21D 24/14 72/21.5 |
| 5,692,405 | A * | 12/1997 | Kirii | G05B 19/4163 72/16.1 |
| 8,234,897 | B2 * | 8/2012 | Kuwayama | B21D 22/20 72/21.4 |
| 2011/0192232 | A1 * | 8/2011 | Kuwayama | B21D 22/22 73/799 |
| 2017/0140081 | A1 * | 5/2017 | Suzuki | B21D 22/00 |

FOREIGN PATENT DOCUMENTS

| | | | |
|---|---|---|---|
| CN | 105537359 A | 5/2016 | |
| DE | 42 29 155 A1 | 3/1994 | |
| DE | 199 54 310 A1 | 5/2001 | |
| DE | 103 31 939 A1 | 2/2005 | |
| DE | 10 2006 031 438 B4 | 1/2008 | |
| DE | 10 2010 035 982 A1 | 3/2012 | |
| DE | 10 2012 202 778 A1 | 8/2012 | |
| DE | 10 2012 002 213 A1 | 8/2013 | |
| DE | 102012008720 A1 * | 11/2013 | ............ G06F 30/23 |
| DE | 10 2012 018 606 A1 | 3/2014 | |
| DE | 10 2014 004 521 A1 | 10/2015 | |
| DE | 10 2014 221 550 A1 | 4/2016 | |
| DE | 10 2015 203 226 A1 | 8/2016 | |
| DE | 10 2015 012 795 A1 | 4/2017 | |
| EP | 0893171 A1 * | 1/1999 | ............ B21D 22/22 |
| EP | 1 658 910 A2 | 5/2006 | |
| EP | 1 741 500 A1 | 1/2007 | |
| EP | 1 743 718 A2 | 1/2007 | |
| JP | 09029358 A * | 2/1997 | |
| KR | 10-2008-0011609 A | 2/2008 | |
| KR | 10-2009-0003867 A | 1/2009 | |
| KR | 20090003867 A * | 1/2009 | |
| KR | 10-2016-0134901 A | 11/2016 | |

OTHER PUBLICATIONS

Wifi, Abdalla & A, Mosallam. (2007). Some aspects of blank-holder force schemes in deep drawing process. Journal of Achievements in Materials and Manufacturing Engineering. 24. (Year: 2007).*

JP-09029358-A Machine Translation, 1997 (Year: 1997).*

PCT/EP2018/071360, International Search Report dated Nov. 7, 2018 (Two (2) pages).

German Search Report issued in German counterpart application No. 10 2017 215 394.5 dated Apr. 30, 2018, with Statement of Relevancy (Six (6) pages).

English-language Chinese Office Action issued in Chinese application No. 201880040161.X dated Oct. 10, 2020 (Nine (9) pages).

* cited by examiner

PRIOR ART

PRIOR ART

METHOD FOR OPERATING A FORMING PRESS

CROSS REFERENCE TO RELATED APPLICATIONS

This application is a continuation of PCT International Application No. PCT/EP2018/071360, filed Aug. 7, 2018, which claims priority under 35 U.S.C. § 119 from German Patent Application No. 10 2017 215 395.4, filed Sep. 4, 2017, the entire disclosures of which are herein expressly incorporated by reference.

BACKGROUND AND SUMMARY OF THE INVENTION

A method for operating a forming press is specified.

For the production of sheet metal parts for vehicle bodies by means of cold forming, production processes consisting of several operations are carried out. The first shaping operation is conventionally the drawing stage. The forming tool used for the drawing stage conventionally consists of a female die, a male die and a sheet holder. Additional components, such as top box and bottom box, or slide, inserts, etc., may also be contained in the forming tool. If boxes are contained in the forming tool, conventionally the top box is fixedly connected to the female die and the bottom box to the male die. Lower air pins which are fixedly connected to the sheet holder are located on the lower side of the sheet holder.

The forming tool is operated in a forming press provided for this purpose. The female die or the top box is fastened here to the ram. Male dies or bottom boxes are fastened to the tabletop. The sheet holder stands with the lower air pins on the press sleeves which, in turn, stand on the pressure pad. The pressure pad stands on hydraulic cylinders and is fixedly connected thereto. The number of hydraulic cylinders can vary depending on the press. The sheet to be formed rests on the sheet holder. One or more drawing aids can be located between the sheet holder and the female die in order to influence the gap between the two tool components. During the forming process, the ram moves vertically downward and in doing so displaces the entire system consisting of sheet holder, press sleeves and pressure pad. The hydraulic cylinders here exert a counterforce which is conducted via the pressure pad into the press sleeves and lower air pins into the sheet holder. This method is described in document DE 199 543 10 A1.

In this operation, the properties and qualities of the formed components depend quite substantially on the material flow of the sheet, which takes place in the contact region between the female die and the sheet holder. The material flow is decisively influenced here by the pressure distribution between the sheet and the sheet holder.

In the process described further above, the pressure distribution between the sheet and the sheet holder is produced by the hydraulic cylinders introducing force into the sheet holder and by the spacing by means of drawing aids. It is desirable to adjust the pressure distribution between the sheet holder and the sheet not only before, but also during the forming process in order to achieve an optimum forming result.

One possibility consists in influencing the pressure distribution via the hydraulic cylinders. A method which partially uses manipulation of the hydraulic cylinders to vary the pressure distribution between the sheet and the sheet holder is described in document DE 199 543 10 A1. The pressure distribution between the sheet and sheet holder can additionally be varied during the forming process via piezo actuators. The actual force is not measured in document DE 199 543 10 A1.

A further possibility consists in the manipulation of the drawing aids. The height of the drawing aids can be influenced by hydraulic, pneumatic, electrical or other means. The variation in the height of the drawing aids has a direct effect on the pressure distribution between the sheet and sheet holder. Methods of this type are described, for example, in documents DE 10331939 A1, DE 102006031438 B4, DE 102012018606 A1, DE 102012002213 A1, DE 102012202778 A1, DE 102014221550 A1 or DE 102015203226 A1.

Furthermore, the document DE 102014004521 A1 describes a press device in which a force transmission element is configured as an actuator which can be activated electrically, hydraulically or pneumatically.

The document KR 2008011609 A describes a method for increasing the service life of a forming press and for reducing the vibrations produced in the forming process. For this purpose, use is made of magneto rheological lower air pins and piezoelectric sensors in the drawing aids. The piezoelectric sensors measure the forming forces in the drawing aids and transmit a control signal to the magneto rheological lower air pins.

In most of the cited documents, in addition to actuators use is also made of sensors which measure an actual variable and control the actuator until a desired variable is measured.

Irrespective of which possibilities the presented methods for varying the contact pressure between the sheet and sheet holder permit, it is important to clarify how the desired variables for the control system are determined. It is expedient to control the actuators depending on results in the forming simulation since the geometries of the forming tool are normally engineered with the aid of forming simulation.

The document DE 199 543 10 A1 describes a connection to a forming simulation. In this case, the actuators are manipulated until the feed from the simulation corresponds to reality. However, measurement of the feed during the forming process turns out to be difficult and constitutes a particular challenge in the case of bent sheet holders. The conversion of the feed differential into a signal for the force actuators is also a challenge since the manner of operation of press and tool has to be comprehensively known.

An object to be achieved by at least some embodiments is to specify a method for operating a forming press, in which method a forming simulation which depicts the influence of press and tool to a sufficient extent is used to obtain the desired values necessary for a control circuit, and the feed differential does not need to be converted into a signal for the force actuators.

In the method described here for operating a forming press, a forming press is provided which has a plurality of press components and a plurality of tool components. The press components can be, for example, a pressure pad, a tabletop or a ram of the press. The tool components can be, for example, a top box, a bottom box, a female die, a male die, a sheet holder or drawing aids of the press.

The forming press furthermore has at least one force sensor and at least one force actuator which are each arranged in a press component and/or tool component. The force sensor can have, for example, one or more strain gauges or can comprise one or more piezo elements. The force actuator can be configured, for example, as a pneumatic actuator, as a hydraulic actuator or as a piezo actuator. For example, the length of the force actuator can be variable.

Furthermore, in the method, a forming simulation is carried out which takes into consideration an elastic behavior of press components and/or tool components. The components of the press are advantageously modeled here within the simulation model of the forming simulation not only as rigid bodies, but as deformable bodies which can have an elastic behavior, in particular a linear-elastic behavior.

The forming simulation is used to determine desired values of forces acting on at least one press component and/or tool component. In particular, the simulation model at the basis of the forming simulation can permit the desired values of the forces to be calculated over the entire duration of the forming process.

Furthermore, the forming press is used to carry out a forming process in which, for example, a metal plate is formed or deep-drawn, wherein, during the forming process, actual values of forces acting on the press component and/or tool component are measured by means of the force sensor, and the force actuator is activated via a control circuit in such a manner that the actual values correspond to the desired values from the forming simulation.

The method described here includes the use of a simulation model for the forming simulation, the simulation model depicting to a sufficient extent the influence of press components and/or tool components, and also the use for determining desired values for the control process in the actual tool. This has the advantage that expedient desired values can be provided for the control process, and it can be guaranteed that the process forces in the forming process are as similar as possible to those in the forming simulation. In addition, the feed differential does not need to be converted into a signal for the force actuators.

According to a further embodiment, during the forming simulation, at least the majority of the press components and/or tool components are modeled as solid bodies. For example, all of the press components and/or tool components of the press are modeled as solid bodies. In particular, during the forming simulation, use can be made of a simulation model which comprises a solid model for the press components and/or tool components.

The effect which can advantageously be achieved is that the influence of the press components and/or tool components of the press can be depicted to a sufficient extent and therefore the desired values necessary for the control circuit can be supplied, wherein the influence of the control circuit used in the actual forming process is correctly depicted in the forming simulation. In contrast thereto, in the known methods, only the surfaces of the press, in particular the operative surfaces of the tool components of the press, are modeled, and the bodies are assumed to be infinitely rigid, which leads to an unsatisfactory depiction of the reality in the forming simulation.

According to a further embodiment, during the forming simulation or in the simulation model at the basis of the forming simulation, the mass inertia and/or the speed and/or the mountings of the press components and/or tool components moving in the forming process are taken into consideration. Alternatively or additionally, during the forming simulation, linkages, displacements and/or deflections of press components and/or tool components that possibly also occur during the actual forming process can be taken into consideration.

According to a further embodiment, the force actuator and the force sensor are arranged in the same press component and/or tool component of the press. The force actuator and the force sensor can be arranged, for example, in one or more recesses of a tool component of the press.

For example, the force actuator and/or the force sensor can be arranged in a pressure pin of the press, such as, for example, in a lower air pin or a press sleeve. The pressure pin is preferably configured for directly or indirectly transmitting a force to a further tool component of the press, for example for transmitting a force to a sheet holder. Furthermore, the force actuator and/or the force sensor can be arranged, for example, in a drawing aid of the press.

According to a further embodiment, the force actuator and the force sensor are arranged in different press components and/or tool components. For example, the force actuator can be arranged in a pressure pin of the press and the force sensor can be arranged in a drawing aid of the press.

The force actuator and the force sensor are preferably connected to each other via the control circuit. The signals from the force sensor can be compared, for example, with a reference variable, in particular from the forming simulation, and a possible value deviation can be taken into account by a control unit which controls the force actuator. The transmitted force can be measured in turn by the force sensor and a comparison made with the reference variable.

According to a further embodiment, the forming press has a plurality of force sensors and force actuators which are each arranged in press components and/or tool components of the press, and wherein all of the force actuators are activated via the control circuit in such a manner that the actual values correspond to the desired values from the forming simulation. In particular, an online measurement can take place by means of the force sensor or by means of the force sensors during the forming process.

According to a further embodiment, during the forming simulation, the desired value force profile over the entire duration of a simulated forming process is determined. In particular, during the forming simulation, the force profile, i.e., force/time, over the entire forming process can be simulated, and therefore desired values for the entire duration of the forming are available for the actual forming process.

According to a further embodiment, control by means of the control circuit takes place over the entire duration of the actual forming process. It can thereby be ensured that the simulated desired values of the forces are achieved via the control circuit during the complete actual forming process.

During actual forming processes, frequently constructionally identical presses have different process forces during the same forming process and therefore supply different forming results with the same forming tool. Among the reasons for this are tolerances in the construction of the press and the press stress which sometimes acts on the individual components for years.

The method described here makes it possible to determine the desired values from the simulation and to adapt the different process forces of the forming presses to those of the simulation. By this means, it can be guaranteed that, irrespective of the press used, the process forces used in the forming process are very greatly similar, which, in turn, leads to accurately reproduced forming results and to a very great similarity to the forming result from the forming simulation.

The use of a simulation model for the forming simulation, the simulation model sufficiently depicting the influence of press and tool, makes it possible, for example, for the methods for varying the contact pressure between the sheet and sheet holder to have already been tested and calibrated by simulation.

Further advantages and advantageous embodiments of the method described here emerge from the embodiments described below in conjunction with FIGS. 1 to 5.

Other objects, advantages and novel features of the present invention will become apparent from the following detailed description of one or more preferred embodiments when considered in conjunction with the accompanying drawings.

DETAILED DESCRIPTION OF THE DRAWINGS

In the exemplary embodiments and Figures, identical or identically acting components can each be provided with the same reference sign. The elements depicted and the size ratios thereof in relation to one another should basically not be considered as being true to scale. Rather, individual elements may be illustrated with excessive thickness or in a large size for better illustration and/or for better comprehension.

Figure 1:
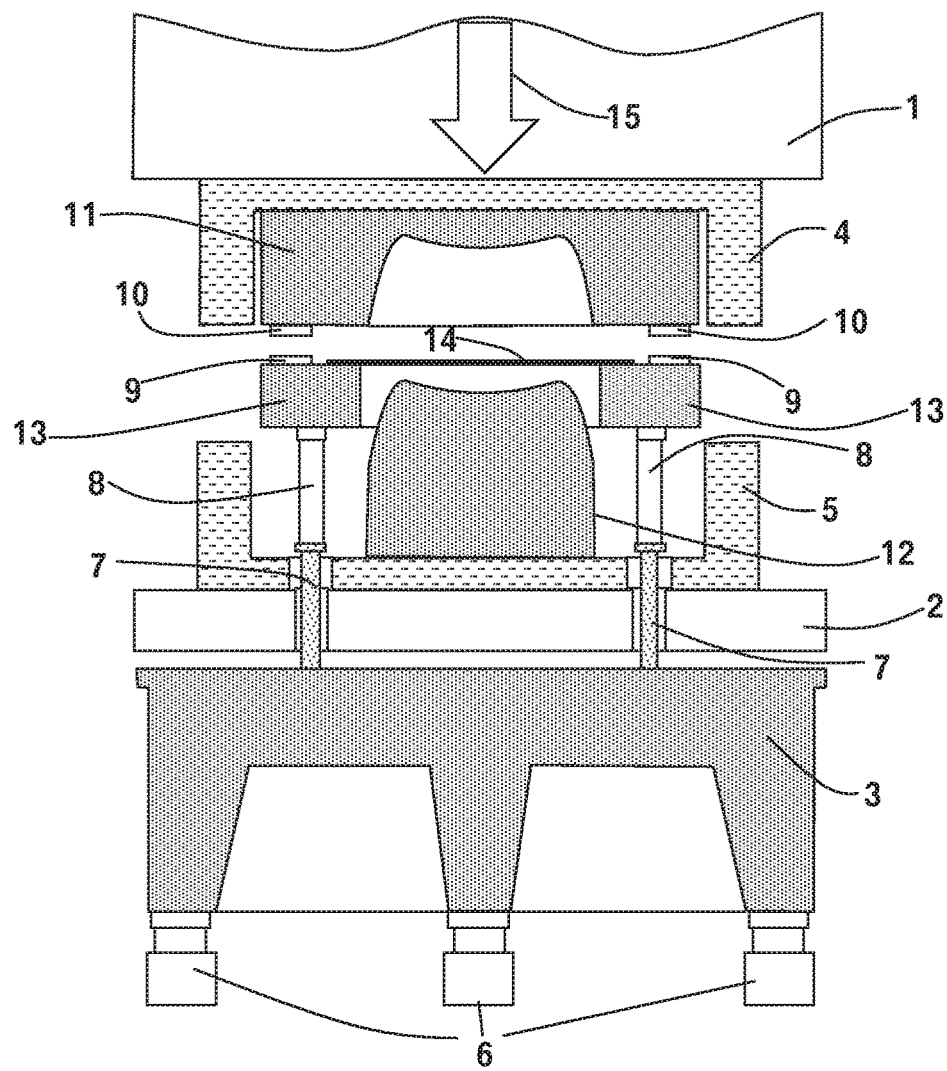
FIG. 1 shows a schematic view of a press according to the prior art.

FIG. 1 shows a schematic view of a press 100 according to the prior art. The press 100 is configured as a forming press for forming a plate 14, and has a ram 1, a tabletop 2, a top box 4 and bottom box 5 which are arranged in between, a pressure pad 3 and a multiplicity of hydraulic cylinders 6. Furthermore, the press 100 has a multiplicity of press sleeves 7 which are configured to transmit the force from the hydraulic cylinders 6 to lower air pins 8. Further elements of the press 100 are the female die 11, the male die 12, the sheet holder 13 and the spacer plate on the lower side 9 and the spacer plate on the upper side 10. The working direction of the ram during a forming process is indicated by reference sign 15.

Figure 2:
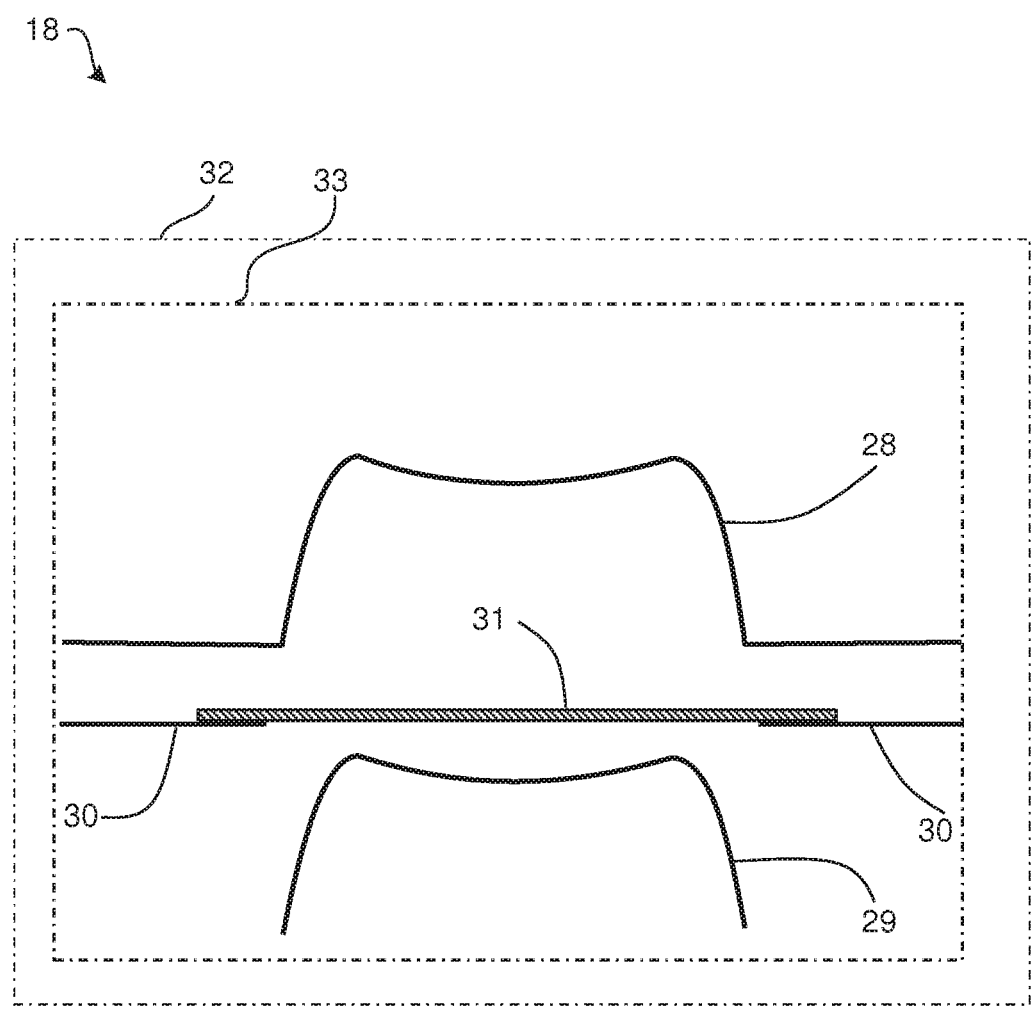
FIG. 2 shows a schematic illustration of a forming simulation according to the prior art.

FIG. 2 shows a schematic illustration of a forming simulation 18 with rigid active surfaces according to the prior art. The simulation model at the basis of the forming simulation 18 includes a finite element method mesh (FEM) of the active surface of the female die 28, a FEM mesh of the active surface of the male die 29, a FEM mesh of the active surface of the sheet holder 30 and a FEM mesh of the plate 31. The starting conditions and the boundary conditions of the forming simulation 18 are illustrated schematically and are provided with reference signs 5 and 6.

In the forming simulation 18 in the prior art, only the active surfaces of the tool components are simulated or the individual bodies, with the exception of the plate 31, are modeled as infinitely rigid bodies.

Figure 3:
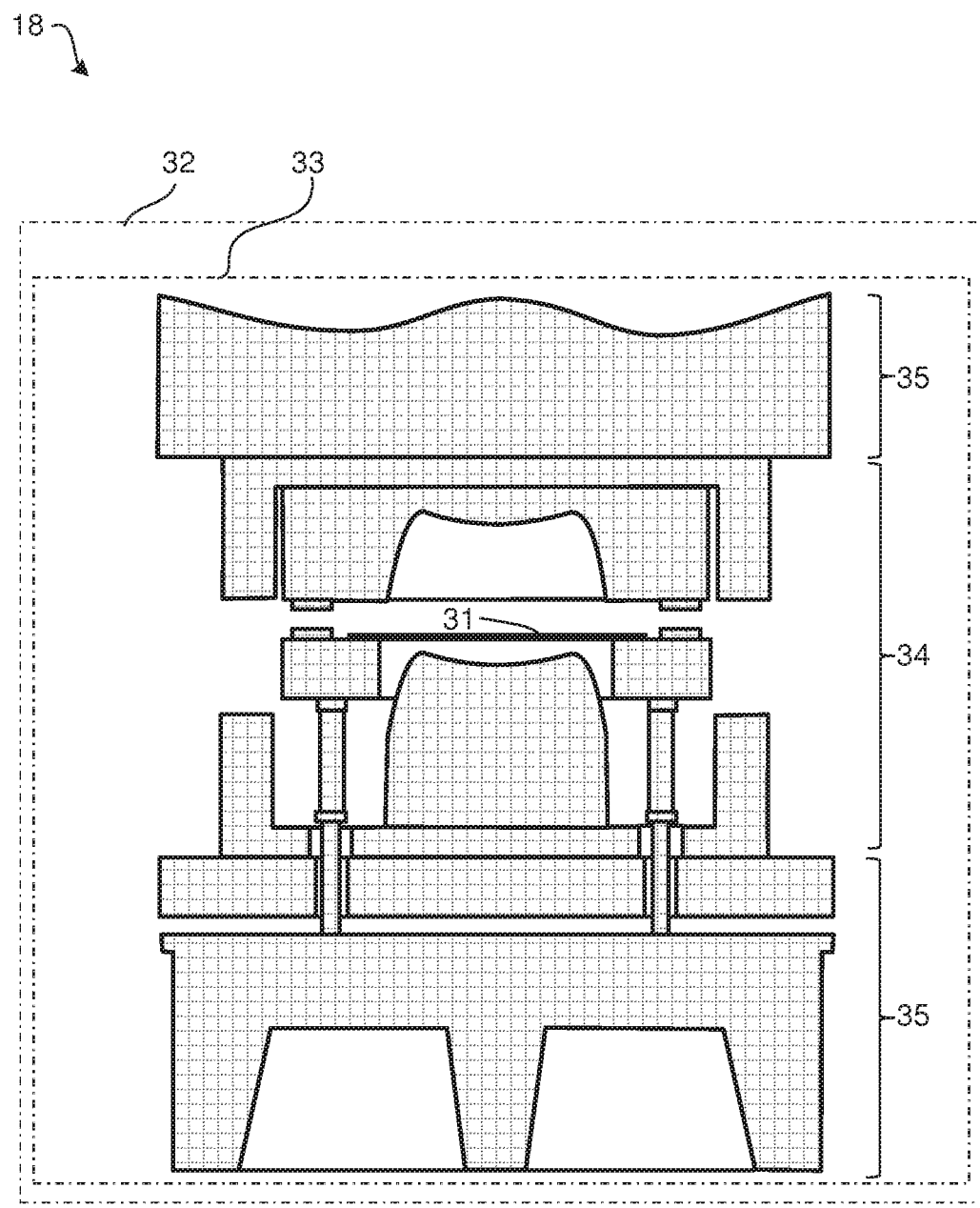
FIG. 3 shows a schematic illustration of a forming simulation of a method described here according to an exemplary embodiment.

FIG. 3 shows a schematic illustration of a forming simulation 18 which is carried out during the method described here for operating a forming press and which depicts the influence of the forming press or of the press components and tool components of the forming press.

The starting conditions of the forming simulation are denoted by reference sign 32, the boundary conditions of the forming simulation by reference sign 33, the FEM mesh of the forming tool or of the tool components of the forming press is denoted by reference sign 34, the FEM mesh of the forming press or of the press components of the forming press is denoted by reference sign 35, and the FEM mesh of the plate to be formed is denoted by reference sign 31.

Unlike in the prior art, the elastic behavior of the press components and tool components is taken into consideration in the forming simulation. In particular, in the simulation model at the basis of the forming simulation, the press components and tool components are modeled as solid bodies and the forces acting on the press components and/or tool components or transmitted by the press components and/or tool components, for example forces which act on one or more pressure pins or on one or more drawing aids, are taken into consideration in the forming simulation.

Figure 4:
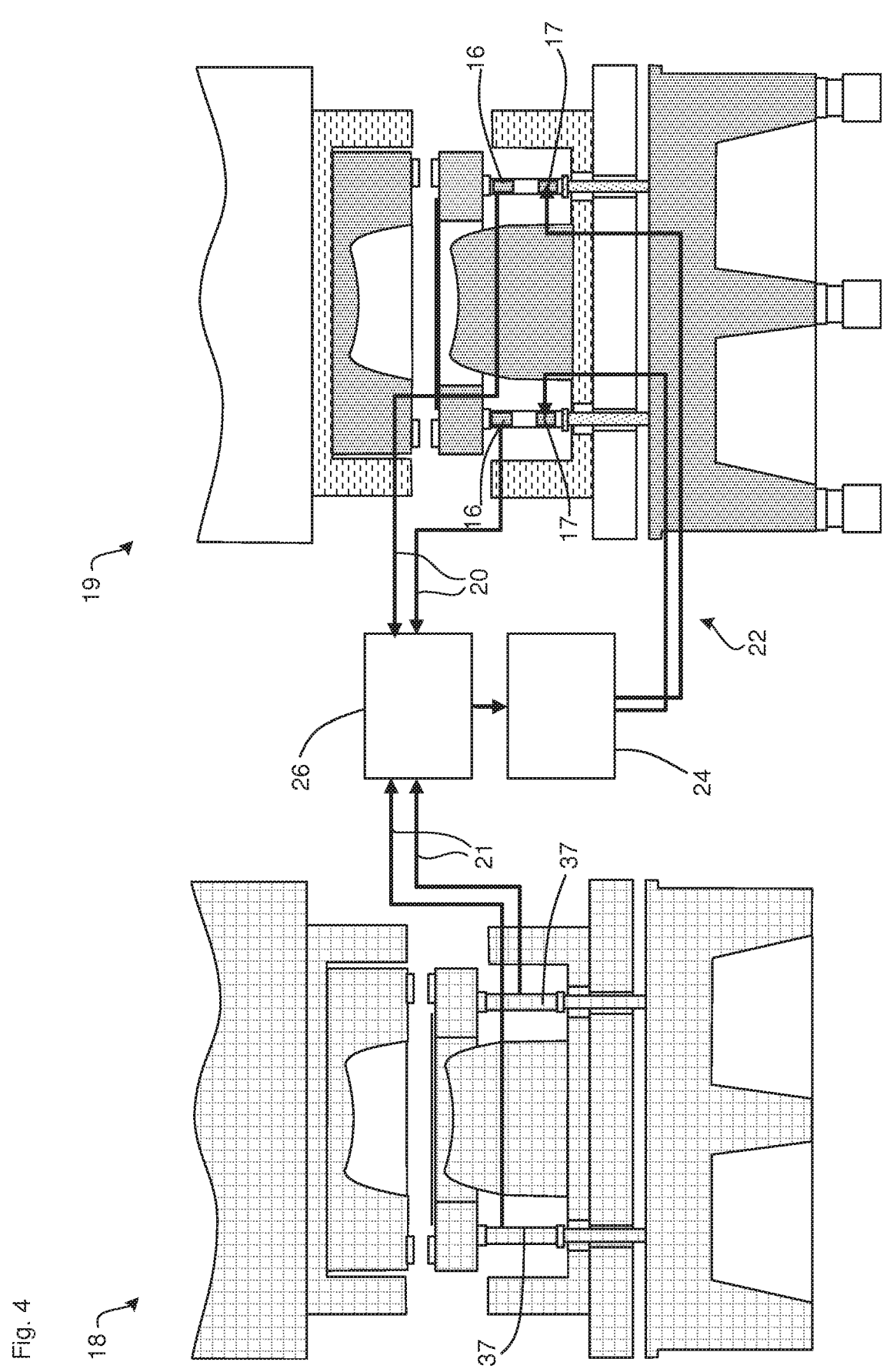
FIG. 4 shows a schematic illustration of a method described here for operating a forming press according to an exemplary embodiment.

FIG. 4 shows a method described here for operating a forming press, in which a forming press is provided which has a plurality of force sensors 16 and force actuators 17 which are each arranged in a tool component of the press. In the exemplary embodiment shown, the force sensors 16 and force actuators 17 are arranged in lower air pins of the forming press.

A forming simulation 18 which takes into account an elastic behavior of press components and/or tool components of the press is carried out in the method. In particular, the lower air pins of the forming press simulation model of the forming simulation 18 are also modeled as FEM lower air pins 37.

Furthermore, desired values 21 of forces acting on at least one press component and/or tool component are determined by means of the forming simulation 18, and an actual forming process 19 is carried out by means of the forming press, wherein, during the forming process 19, actual values 20 of forces which act on the press component and/or tool component are measured by means of the force sensors 16. The force actuators 17 are activated via a control unit 24 of a control circuit 22 in such a manner that the actual values 20 correspond to the desired values 21 from the forming simulation 18. The targeted activation of the force actuators 17 makes it possible to reduce or eliminate a possible value deviation 26 between the desired values 21 and the actual values 20.

Figure 5:
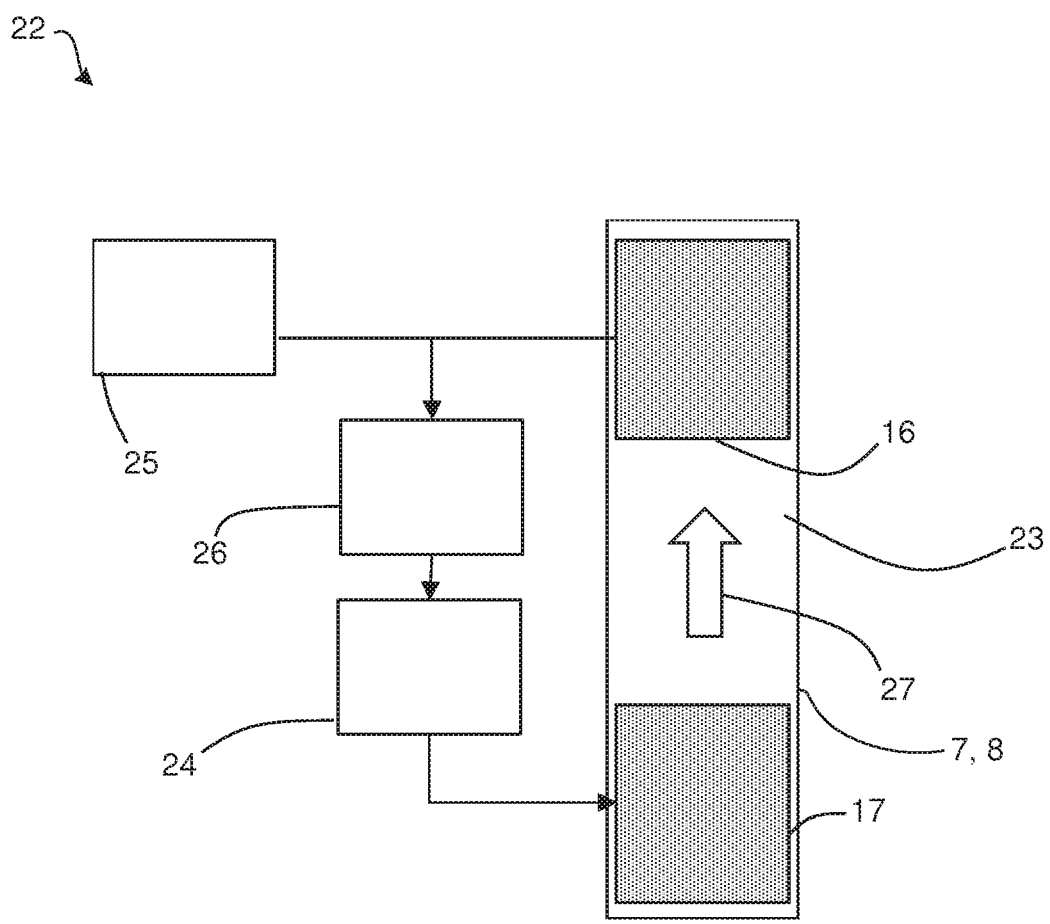
FIG. 5 shows a schematic illustration of a control circuit of a method described here according to a further exemplary embodiment.

FIG. 5 shows a schematic illustration of a control circuit 22 via which the force sensor 16 and the force actuator 17, which are arranged in a tool component 23 of the forming press, are connected. In the exemplary embodiment shown, the force sensor 16 and the force actuator 17 are arranged in a pressure pin, which can be a press sleeve 7 or a lower air pin 8.

Alternatively, the force sensor 16 and the force actuator 17 can also be jointly arranged in other press components or tool components of the forming press or in each case integrated in different press components and/or tool components.

By comparing a reference variable 25 with the values of the force sensor 16, a value deviation 26 can be determined. Depending on the value deviation 26, corresponding signals can be passed to the control unit 24 of the control circuit 22 which then, in turn, passes signals to the force actuator 17 such that a targeted adjustment of the force actuator 17 can take place.

The transmitted force 27 can then be measured in turn by the force sensor 16 and compared with the reference variable 25. An online measurement is thereby advantageously possible, and therefore the pressure distribution between the sheet holder and the sheet can be adjusted or controlled and regulated even during the forming process.

The features described in the exemplary embodiments shown can also be combined with one another according to further exemplary embodiments. Alternatively or additionally, the exemplary embodiments shown in the Figures can have further features according to the embodiments of the general description.

LIST OF REFERENCE CHARACTERS

1 Ram
2 Tabletop
3 Pressure pad
4 Top box
5 Bottom box
6 Hydraulic cylinder
7 Press sleeve
8 Lower air pin
9 Spacer plate, lower side
10 Spacer plate, upper side
11 Female die
12 Male die
13 Sheet holder
14 Plate
15 Working direction of the ram during the forming process
16 Force sensor
17 Force actuator
18 Forming simulation
19 Actual forming process
20 Actual values
21 Desired values
22 Control circuit
23 Tool component
24 Control unit
25 Reference variable
26 Value deviation
27 Force
28 FEM mesh of active surface of the female die
29 FEM mesh of the active surface of the male die
30 FEM mesh of the active surface of the sheet holder
31 FEM mesh of the plate
32 Starting conditions of the forming simulation
33 Boundary conditions of the forming simulation
34 FEM mesh of the forming tool
35 FEM mesh of the forming press
37 FEM lower air pin
100 Press The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a forming press which has a plurality of press components, a plurality of tool components, a force sensor, and a force actuator, comprising the acts of:

carrying out a forming simulation which takes into consideration an elastic behavior of the plurality of press components and the plurality of tool components of the forming press by modeling the plurality of press components and the plurality of tool components not only as rigid bodies but as deformable bodies which have the elastic behavior, wherein the plurality of press components includes a pressure pad, a tabletop, and a ram, and wherein the plurality of tool components includes a top box, a bottom box, a female die, a male die, a sheet holder, and drawing aids;

determining desired values of forces acting on at least one press component of the plurality of press components and on at least one tool component of the plurality of tool components by the forming simulation; and carrying out a forming process by the forming press wherein, during the forming process, actual values of forces acting on the at least one press component of the plurality of press components and on the at least one tool component of the plurality of tool components are measured by the force sensor and the force actuator is activated by a signal via a control circuit such that the actual values correspond to the desired values from the forming simulation, and wherein a feed differential for the force actuator is not converted into the signal.

2. The method according to claim 1, wherein the force actuator and the force sensor are disposed in a same press component of the plurality of press components or tool component of the plurality of tool components.

3. The method according to claim 1, wherein the force actuator and the force sensor are respectively disposed in a different component of the plurality of press components and the plurality of tool components.

4. The method according to claim 1, wherein the force actuator and/or the force sensor are disposed in a pressure pin of the forming press.

5. The method according to claim 4, wherein the pressure pin is a lower air pin.

6. The method according to claim 4, wherein the pressure pin is a press sleeve.

7. The method according to claim 1, wherein, during the forming simulation, a desired value force profile over an entire duration of a simulated forming process is determined.

8. The method according to claim 1, wherein control by the control circuit takes place during an entire duration of the forming process.

9. The method according to claim 1, wherein, during the forming simulation, a mass inertia and/or a speed of the plurality of press components and/or the plurality of tool components moving during the forming process are taken into consideration.

10. The method according to claim 1, wherein the forming press has a plurality of force sensors and a plurality of force actuators which are each respectively disposed in the plurality of press components and/or the plurality of tool components and wherein all of the force actuators are activated via the control circuit such that the respective actual values correspond to the respective desired values from the forming simulation.

* * * * *